United States Patent [19]
Fukazawa et al.

[11] Patent Number: 5,558,502
[45] Date of Patent: Sep. 24, 1996

[54] TURBO PUMP AND SUPPLY SYSTEM WITH THE PUMP

[75] Inventors: Tetsuo Fukazawa; Chugen Chin, both of Narashino, Japan

[73] Assignee: Pacific Machinery & Engineering Co., Ltd., Tokyo, Japan

[21] Appl. No.: 359,907

[22] Filed: Dec. 20, 1994

[30] Foreign Application Priority Data

Dec. 24, 1993 [JP] Japan .................................. 5-328130
Nov. 8, 1994 [JP] Japan .................................. 6-273244

[51] Int. Cl.$^6$ .............................. F04D 29/22; F04B 9/10; F04B 49/00
[52] U.S. Cl. ........................ 417/36; 417/390; 417/391; 417/407; 416/223 B
[58] Field of Search .......................... 416/223 A, 223 B; 417/40, 41, 47, 390, 391, 405, 407, 36

[56] References Cited

U.S. PATENT DOCUMENTS

| | | | |
|---|---|---|---|
| 1,693,102 | 11/1928 | Worthington | 417/390 |
| 2,726,606 | 12/1955 | Davidson | 417/390 |
| 3,981,626 | 9/1976 | Onal | 417/405 |
| 4,721,436 | 1/1988 | Lepert | 417/391 |
| 5,242,268 | 9/1993 | Fukazawa et al. | 416/223 B |

FOREIGN PATENT DOCUMENTS 287345  3/1953  Switzerland ......................... 417/390

*Primary Examiner*—Michael Koczo
*Attorney, Agent, or Firm*—Kane, Dalsimer, Sullivan, Kurucz, Levy, Eisele and Richard, LLP

[57] ABSTRACT

In a turbo, pump according to the present invention, blades $3e$ and a shroud $3f$ are continuously formed with a boss $3c$ of a turbine wheel 3, a meridian plane configuration of the shroud $3f$ is formed as an concave arcing rotatable surface. A boss shroud $3f_1$ is formed substantially parallel to the axis of rotation O. A portion $3e_2$ of a blade outlet edge $3e_1$ is smoothly continuous to the boss shroud $3f_1$ and largely projects downstream. A portion $3e_3$ of the blade outlet edge $3e_1$ is formed substantially perpendicular to the axis of rotation O. The blade outlet edge $3e_1$ is formed with a smooth arc-like curve projecting convexly downstream between the portion $3e_3$ and the portion $3e_2$. An angle of the blade outlet edge $3e_1$ is set to an angle of substantially 0° at the portion $3e_2$ of the blade outlet edge $3e_1$ and to substantially the conventional degree of angle at the portion $3e_3$ of the blade outlet edge $3e_1$. Further, the blade inlet $3a$ and the blade outlet $3b$ are connected there between by a curve.

7 Claims, 11 Drawing Sheets

TURBO PUMP AND SUPPLY SYSTEM WITH THE PUMP

BACKGROUND OF THE INVENTION

The present invention relates to a turbo pump of which a pump impeller is rotated by rotation of a turbine wheel, and in particular to a turbo pump in which fluid comprising liquid, gas, or an intermediate such as a two-phase fluid mixture of liquid and gas can be employed as working fluid of a turbine wheel and in which fluid comprising liquid, gas, or an intermediate such as a two-phase fluid mixture of liquid and gas can be employed as carried fluid of a pump impeller just like the working fluid of the turbine wheel.

Furthermore, the present invention relates to a fluid supply system using a turbo pump which intensively performs a supply management by pumping out liquid to store it in a tank, wherein the turbo pump disposed in liquid stored in a liquid-storing place such as a deep well or the like, sending out the liquid from the tank to a supply line.

Conventionally, a turbocharger which is designed to use gas as fluid is well known as a turbo pump. Such turbochargers have been developed with development of turbojet engines of aircraft. Today, many of them are each used as a turbocharger for fuel fluid supply system of a vehicle.

A turbocharger disclosed in Japanese Utility model Gazette No. H4(1992)-15956 is a typical type of turbocharger according to the conventional design. As shown in FIG. 15, the turbocharger 70 comprises a compressor impeller 72 rotatably disposed in a compressor casing 71 and a turbine wheel 75 fixed to a rotor shaft 73 of the compressor impeller 72 and rotatably disposed in a turbine housing 74. The turbine wheel 75 is rotated by exhaust gas of an engine (not shown) which is introduced from a scroll portion 76 and then the compressor impeller 72 is rotated by the rotation of the turbine wheel 75 through the rotor shaft 73. By the rotation of the compressor impeller 72, air is sucked from an inlet 77 of the compressor casing 71 and is sent toward the engine through a scroll portion 78 of the compressor casing 71. The exhaust gas of the engine is exhausted from an outlet 79 of the turbine housing 74 after rotating the turbine wheel 75.

Thereby, it is possible to increase the output of the engine and to make the speed of the engine higher.

By the way, in the turbo pump, generally such as the turbocharger or the like, unless making the speed higher, it is impossible to improve the efficiency of the system. Thereby there is no sense in providing the turbo pump to the system. In the conventional turbo pump, such as the turbocharger described above, the high speed phenomenon that occurs when the fluid used is a gas, causes no particular trouble. Therefore, when the fluid used is gas, it is relatively easy to make the speed of the turbo pump higher so that various turbo pumps has been developed in the past.

In recent years, there is a large demand for carrying liquid or an intermediate comprising a two-phase fluid mixture of liquid and gas. Therefore, a turbo pump which can carry liquid or an intermediate is necessary.

However, as unlikely as it is to occur when gas is employed as the fluid for the turbo pump, when liquid is employed as the fluid, cavitation, which is a phenomenon peculiar to liquid, easily occurs as the turbo pump is speeded up. In the turbo pump in which liquid is employed, it is not easy to make the speeds of the turbine and the pump higher due to cavitation.

Published Unexamined Patent Application No. S51(1976)-91003 proposed a deep-well pump, as the turbo pump in which liquid is employed as the working fluid for turbine, which is designed for pumping out high-temperature brine of which temperature is between 177° C. and 331° C. from a geothermal well of which depth is 1,500~3,000 m below the ground.

Since the deep-well pump is used for a special purpose of pumping up the high-temperature brine from the place where is quite deep, 1,500~3,000 m below the ground, a turbine of the deep-well pump has a staged structure to increase an output of a pump thereof.

However, by making the turbine staged structure as mentioned above, it makes the structure complex and makes the system large, further, makes the cost high. In addition, because of this situation, it is difficult to set the revolution of the pump at a high speed. Even if the revolution is set at somewhat high speed, the cavitation which is a phenomenon peculiar to liquid occurs.

Consequently, an ordinary turbo pump in which liquid or an intermediate is employed and which has a simple structure and is low-priced is not practically used yet for the time being.

On the other hand, a fluid supply system is shown in FIG. 16 as a fluid supply system in which a liquid pump disposed in liquid is used. In this Figure, the numeral 50 designates the fluid supply system, the numeral 51 designates a deep well, the numeral 52 designates a staged pump, the numeral 53 designates an electric motor, the numeral 54 designates a lifting pipe, the numeral 55 designates a check valve, the numeral 56 designates a sluice valve, the numeral 57 designates a pressure tank, the numeral 58 designates a pipeline to a supply line, the numeral 59 designates a pressure switch, the numeral 60 designates a control board, the numeral 61 designates a cable for connecting the pressure switch 59 and the control board 60 together, the numeral 62 designates a cable for connecting the electric motor 53 and the control board 60 together, the numeral 63 designates a head tank, the numeral 64 designates a pipeline to the supply line, the numeral 65 designates a water level gage, and the numeral 66 designates a cable for connecting the water level gage 65 and the control board 60.

As shown in FIG. 16, in the fluid supply system 50, the staged pump 2 is disposed under the water in the deep well 51, and the staged pump 52 is designed to be a submersible motor pump which is driven by the electric motor 53. Water sucked by the staged pump 52 is carried to the pressure tank 57 through the lifting pipe 54 and stored in the pressure tank 57. The water stored in the pressure tank 57 is carried to the supply line through the pipeline 58 and is supplied from each supplying portion of the supply line. In this case, the inner pressure of the pressure tank 57 is maintained at a predetermined level, and the submersible staged pump is operated by the pressure. As the water in the pressure tank 57 is decreased by supplying the water into the supply line, the inner pressure of the pressure tank 57 is reduced. When the inner pressure of the pressure tank 57 is reduced below the predetermined level, the pressure switch 59 detects this condition, then operates to output a pressure reducing detecting signal to the control board 60. The control board 60 received this signal outputs a driving signal to the electric motor 53 through the cable 62 so the electric motor 53 and the staged pump 52 are driven. Thereby, the staged pump 52 sucks water in the deep well 51 to carry and store the water into the pressure tank 57 through the lifting pipe 54. As the water is carried into the pressure tank 57, the inner pressure of the pressure tank 57 is increased. As the, inner pressure of the pressure tank 57 is increased to the predetermined level, the pressure switch 59 does not output the pressure reducing detecting signal into the control board 60 any more and the control board 60 then stops the operations of the electric motor 53 and the staged pump 52. Therefore, the water is stopped supplying into the pressure tank 57 so that the inner pressure of the pressure tank 57 can be maintained at the predetermined level. Thus, the intensive supply management which supplies water to a plurality of supplying portions from the one deep well 51 is performed.

Instead of the pressure tank 57, the head tank 63 may be disposed at a position higher than the supply line to store water at a predetermined water level in the head tank 63 through the lifting pipe 54 and then supply the water to the supply line from the head tank 63 through the pipeline 64. In this case, the staged pump is controlled by the control board 60 according to a water level decreasing signal by the water level gage 65 disposed in the head tank 63.

However, in the fluid supply system 50 in which the conventional submersible motor pump is employed, the electric motor 53 of the staged pump 52 and a portion of the cable 62 for supplying the driving control signal from the control board 60 to the staged pump 52 are disposed in the water. Therefore, it is necessary to securely waterproof the electric motor 53, the cable 62, and the connecting portion between the cable 62 and the electric motor 53. Further, since the staged pump 52 is relatively large, it is troublesome and not easy to dispose the staged pump 52 into the water in the long and narrow deep well 51, thereby not only taking many man-hours to install it but also making the maintenance quite troublesome. Furthermore, since it is necessary to make the electric motor 53 and the cable 62 to waterproof structure, it costs a great deal.

In addition, with blades of an impeller of such a conventional staged pump, as the impeller is speeded up during operation of the pump, cavitation occurs so that the revolution of the impeller can not be high.

SUMMARY OF THE INVENTION

It is an object of the present invention to provide a turbo pump which allows for higher speed operation even when fluid used is liquid or an intermediate comprising a two-phase fluid mixture of liquid and gas, not to mention gas and which can be easily structured and provided at a low price.

It is another object of the present invention to provide a fluid supply system using a turbo pump which is not needed to be made waterproof structure and can be formed smaller and which allows for easy construction and easy maintenance, furthermore can be constructed at a low cost.

For accomplishing the above mentioned object, the present invention provides a turbo pump comprising a pump impeller rotatably disposed in the pump casing to, by the rotation, carry carried fluid which is any one of liquid, gas, and an intermediate comprising a two-phase fluid mixture of liquid and gas, a turbine wheel rotatably disposed in a turbine casing coaxially with the pump impeller and being rotated by working fluid which is any one of liquid, gas, and an intermediate comprising a two-phase fluid mixture of liquid and gas, the pump impeller being rotated by the rotation of the turbine wheel, wherein the pump impeller comprises a shroud continuously formed with a boss into which a rotor shaft fits and blades each having a blade inlet, the shroud having a concave arcing rotatable surface formed in a meridian plane configuration and a boss shroud formed in a cylindrical configuration substantially parallel to the rotor shaft, an edge of the blade inlet being fixed to the boss shroud to be smoothly continuous from a surface of the boss shroud to the upstream side and largely projecting upstream, the edge of the blade inlet having a portion attached to the cylindrical boss shroud and a portion near the pump casing, the portion near the pump casing extending substantially perpendicular to the rotor shaft, the portion attached to the boss shroud and the portion near the pump casing being connected therebetween by a smooth arc-like curve projecting convexly upstream to thereby form the edge of the blade inlet, an angle of the blade inlet being set to an angle of substantially 0° at the portion of the edge near the boss shroud and increasing continuously from the portion of the edge near the boss shroud to the portion of the edge near the casing, the angle of the blade inlet being varied smoothly between the portion near the boss shroud and the portion near the casing to thereby form the blade inlet, and the blade inlet being connected to the end of the blade outlet with a smooth curved surface to thereby form each of the blades; and the turbine wheel comprises a shroud continuously formed with a boss into which the rotor shaft fits and blades each having a blade outlet, the shroud having a concave arcing rotatable surface formed in a meridian plane configuration and a boss shroud formed in a cylindrical configuration substantially parallel to the rotor shaft, an edge of the blade outlet being fixed to the boss shroud to be smoothly continuous from a surface of the boss shroud to the downstream side and largely projecting downstream, the edge of the blade outlet having a portion attached to the cylindrical boss shroud and a portion near the turbine casing, the portion near the turbine casing extending :substantially perpendicular to the rotor shaft, the portion attached to the boss shroud and the portion near the turbine casing being connected therebetween by a smooth arc-like curve projecting convexly downstream to thereby form the edge of the blade outlet, an angle of the blade outlet being set to an angle of substantially 0° at the portion of the edge near the boss shroud and increasing continuously from the portion of the edge near the boss shroud to the portion of the edge near the casing, the angle of the blade outlet being varied smoothly between the portion near the boss shroud and the portion near the casing to thereby form the blade outlet, and the blade outlet being connected to the end of the blade inlet with a smooth curved surface to thereby form each of the blades.

The turbo pump of the present invention is further characterized by that the angle of the blade inlet of the pump impeller is set to substantially an angle generally calculated by the conventional design techniques at the portion of the edge near the pump casing, the angle of the blade outlet of the turbine wheel is set to substantially an angle generally calculated by the conventional design techniques at the portion of the edge near the turbine casing.

Furthermore, the turbo pump of the present invention is characterized by that the profile of the blade inlet of the pump impeller and the profile of the blade outlet of the turbine wheel are always kept constant, regardless of the combination of the each specific speeds.

The present invention also provides a fluid supply system using said turbo pump comprising the turbo pump installed in fluid in a fluid-storing place such as a well to suck and discharge the fluid and having a pump impeller and a turbine wheel, working fluid supply pump driving means for driving said turbo pump, a tank for storing fluid discharged from said turbo pump, a supply line for receiving the fluid from said tank and supplying the fluid to each supply portion, working fluid supply pump control means for controlling said working fluid supply pump driving means, said turbine wheel connecting to said pump impeller through a rotor shaft for driving said pump impeller, and said working fluid supply pump supplying a part of the fluid in said tank as a working fluid for driving said turbine wheel, part of the fluid discharged by said turbo pump is pressurized by said working fluid supply pump and the pressurized fluid also drives said turbo pump itself.

The fluid supply system using the turbo pump of the present invention is further characterized by that the tank has a partition wall which divides the inside thereof into a first chamber connecting to the discharge of the turbo pump and connected to the working fluid supply pump and a second chamber connected to the supply line, the partition wall being liquid level control means designed to store the liquid having a first predetermined liquid level in the first chamber and to control the liquid level in the first chamber to introduce the liquid overflowing to the second chamber when the liquid in the first chamber is over the first predetermined liquid level in the first chamber.

Further, the fluid supply system using the turbo pump of the present invention is characterized by that the pump control means control the operation of the working fluid supply pump according to the liquid level in the second chamber or the inner pressure of the tank to keep the liquid in the second chamber at a second predetermined liquid level or to keep the inner pressure of the tank at a predetermined level.

In addition, a fluid supply system using a turbo pump as claimed in any one of claims 4, 5, and 6, further comprising, a carried fluid suction pipe line with a check valve connected to an inlet of said turbo pump, through which the fluid sucked by said turbo pump from said fluid-storing place passes, said check valve for allowing the flowing of said fluid toward the inlet of said turbo pump and for preventing the flowing of said fluid in the opposite direction, and a path for introducing said working fluid after driving said turbine wheel to said carried fluid suction pipe line between an inlet of said turbo pump and said check valve, said working fluid after operating said turbine wheel is sucked together with the fluid in said fluid-storing place by said turbo pump.

Further, the fluid supply system using the turbo pump of the present invention the tank is a head tank which is installed at a position higher than the supply line to control to keep the liquid level in the second chamber at the second predetermined liquid level.

In the turbo pump as structured above according to the present invention, the angle of the blade outlet of the turbine wheel is set to an angle of substantially 0° at the portion of the outlet edge near the boss shroud so that the flow of the working fluid of the boss shroud can be guided effectively out of the blades, thereby allowing the uniform constant flow of the working fluid at the portion, near the boss shroud, of the blade outlet. Therefore, the working fluid can flow along the whole blades of the blade outlets without resistance. The portion near the boss shroud largely projects downstream, the portion near the casing is formed substantially perpendicular to the rotor shaft, and the both portions are connected therebetween by the smooth arc-like curve projecting convexly downstream, thereby providing a wider area which the working fluid flows at the blade outlets. Thereby, the working fluid can effectively flow at the blade outlets. Therefore the cavitation characteristics and the turbine efficiency of the turbine are improved.

On the other hand, the angle of the blade inlet of the pump impeller is set to an angle of substantially 0° at the portion of the inlet edge near the boss shroud so that the flow of the carried fluid of the boss shroud can be guided effectively among the blades, thereby allowing the uniform flow of the carried fluid at the portion, near the boss shroud, of the blade inlet. Therefore, the carried fluid can flow along the whole blades of the blade inlets without resistance. The portion near the boss shroud largely projects upstream, the portion near the casing is formed substantially perpendicular to the rotor shaft, and the both portions are connected therebetween by the smooth arc-like curve projecting convexly upstream, thereby providing a wider area which the carried fluid flows at the blade inlets. Thereby, the carried fluid can effectively flow at the blade inlets. Therefore the cavitation characteristics and the pump efficiency of the pump are improved. Since the turbine characteristics of the turbine wheel, the pump characteristics of the pump impeller, and the cavitation characteristics of both the turbine wheel and the pump impeller are thus improved, the pump characteristics and the cavitation characteristics of the turbo pump of the present invention are greatly improved.

Further, the pump according to the present invention can efficiently carry a relatively large flow rate so as to ensure desired flow rate even when the pump is constructed small, thereby allowing for a high-speed operation and small size of the turbo pump. In this case, by improving the cavitation characteristics, the pump allows for further high-speed operation even when the working fluid or the carried fluid is liquid or an intermediate comprising a two-phase fluid mixture of liquid and gas, not to mention gas.

In the fluid supply system using the turbo pump according to the present invention, the turbo pump is driven by the liquid in the liquid-storing place which is then lifted so that the turbo pump is further driven the liquid lifted. Therefore, it is not necessary not only to use special fluid as the working fluid for rotating the turbine wheel of the turbo pump and but also to prevent mixing of the working fluid for the turbine wheel and the carried fluid for the pump impeller. Thereby, the turbo pump is not needed with a seal such as the shaft seal or the like so as to make the waterproof structure of the turbo pump simple, so that the cost of production can be reduced. Because of the simple waterproof structure, the maintenance of the turbo pump is quite easy.

Further, the turbo pump has no electric motor and no cable for supplying electric power to the electric motor so that the turbo pump can be easily installed without any trouble with installing it into liquid, for example, in the long and narrow deep liquid-storing place.

In addition, according to the present invention, the tank is divided into the first chamber in which the liquid for supplying for the turbo pump is stored and the second chamber in which the liquid for supplying for the supply line is stored. Thereby, even when there is no liquid in the second chamber anyway, the liquid in the first chamber is saved, thereby easily and securely operating the turbo pump.

Further, according to the present invention, the working fluid supply pump is controlled according to the liquid level in the second chamber of the tank or the inner pressure of the tank so that the second chamber of the tank can be stored with a predetermined amount of fluid.

Furthermore, since the liquid smoothly flows at the turbine wheel and the pump impeller, even when the pump rotates at a high speed, a cavitation is difficult to occur so that the turbo pump can be easily designed for a high-speed operation and smaller size.

Still other objects and advantages of the present invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Hereinafter, an embodiment of the present invention will now be described referring to attached drawings.

Figure 1:
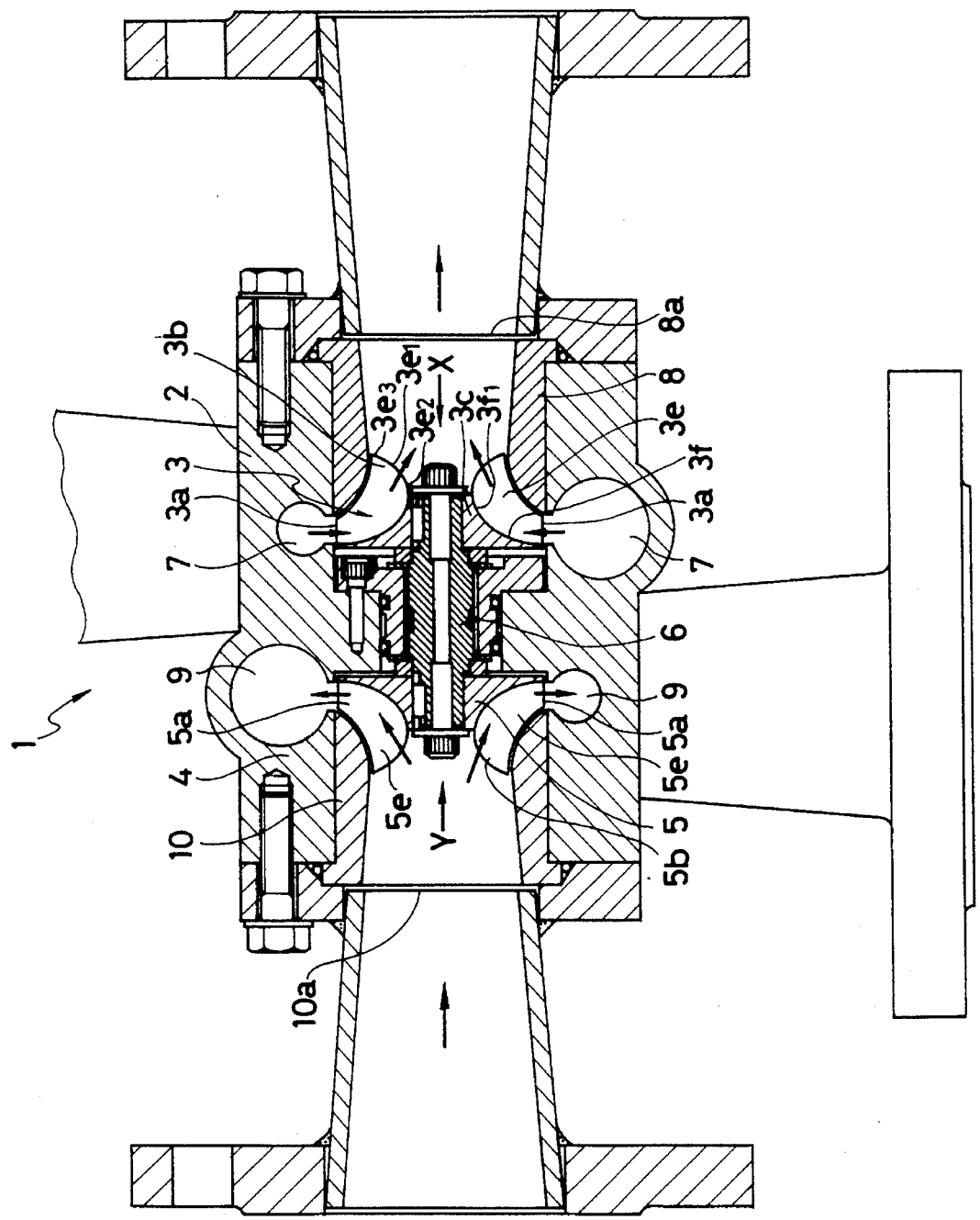
FIG. 1 is a sectional view shown one embodiment of a turbo pump according to the present invention.

FIG. 1 is a sectional view of one embodiment of a turbo pump according to the present invention.

As shown in FIG. 1, a turbo pump 1 according to the present invention comprises a turbine wheel 3 rotatably disposed in a main turbine casing 2, a pump impeller 5 rotatably disposed in a main pump casing 4, and a rotor shaft 6 rotatably supported to a boundary portion between the main turbine casing 2 and the main pump casing 4, wherein the turbine wheel 3 is fixed to one end of the rotor shaft 6 and the pump impeller 5 is fixed to the other end of the rotor shaft 6. In FIG. 1, the main turbine casing 2 and the main pump casing 4 is integrally formed. However, these casings may be separately formed. For convenience, the main turbine casing and the main pump casing are described with different reference numerals, respectively.

The main turbine casing 2 is provided with a turbine inlet path 7 formed in a scroll shape and arranged to communicate with blade inlets $3a$ of the turbine wheel 3, through which working fluid such as water, oil, gas or two-phase fluid mixture thereof for rotating the turbine wheel 3 passes, and a sub turbine casing 8. The sub turbine casing 8 is arranged to guide the working fluid flowing into the blade inlets $3a$ to flow to a blade outlet $3b$ of the turbine wheel 3 and farther guide the working fluid to an outlet $8a$ of the sub turbine casing 8 in corporation with the turbine wheel 3.

The main pump casing 4 is provided with a pump outlet path 9 formed in a scroll shape and arranged to communicate with blade outlets $5a$ of the pump impeller 5, through which carried fluid such as water, oil or two-phase fluid mixture to be carried by the pump impeller 5, and a sub pump casing 10. The sub pump casing 10 is arranged to guide the carried fluid to flow from an inlet $10a$ of the sub pump casing 10 and further guide the carried fluid flowing into blade inlets $5b$ to flow to the blade outlets $5a$ of the pump impeller 5 in corporation with the pump impeller 5.

Figure 3:
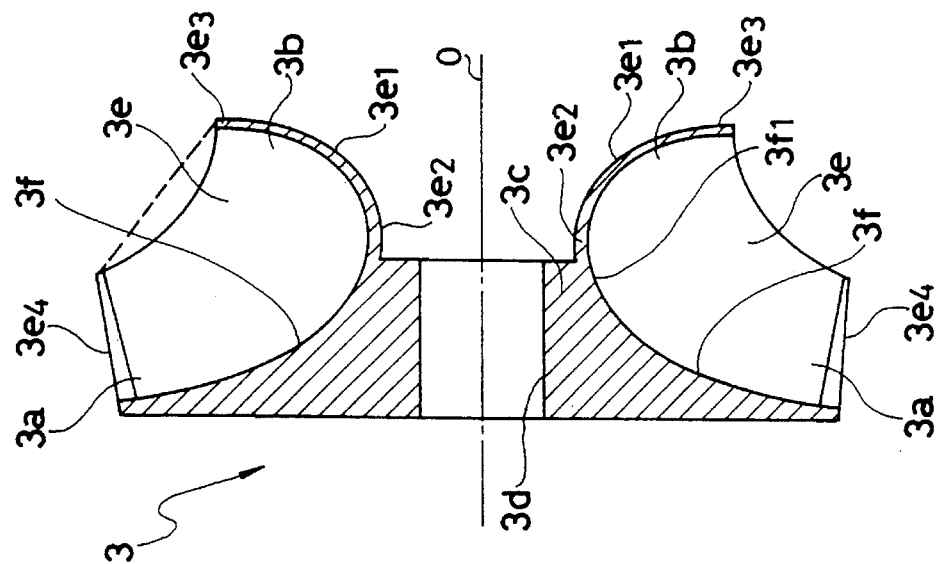
FIG. 3 is a sectional view taken along the line A-O-E of FIG. 2.
Figure 2:
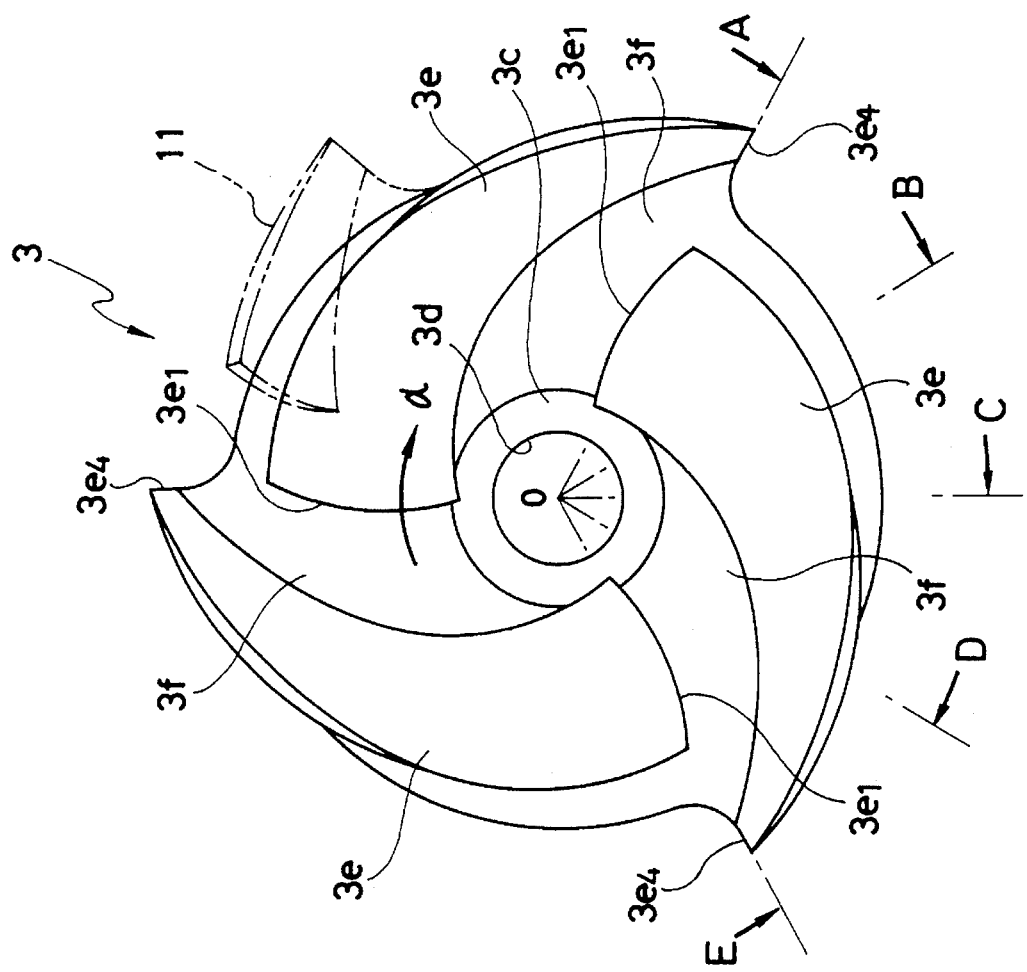
FIG. 2 is a view of a turbine wheel of the embodiment shown in FIG. 1, taken in the direction of the arrow X of FIG. 1.

FIG. 2 is a view of the turbine wheel used in this embodiment, taken in the direction of the arrow X of FIG. 1, FIG. 3 is a sectional view taken along the line A-O-E of FIG. 2, FIG. 4, FIG. 5, and FIG. 6 are sectional views taken along the lines B-O, C-O, D-O of FIG. 2, respectively.

As shown in FIG. 2 and FIG. 3, a through hole $3d$ into which the rotor shaft 6 fits is disposed to penetrate axially the turbine wheel 3 in a boss $3c$ disposed at the center of the turbine wheel 3. Blades $3e$, $3e$, $3e$ are formed on the outer periphery of the boss $3c$. Further, the boss $3c$ is continuously formed with a shroud $3f$ and a meridian plane configuration of the shroud $3f$ is formed as an arcing rotatable surface. A boss shroud $3f_1$, where blade outlet edges $3e_1$ are fixed to, of the shroud $3f$ is formed substantially parallel to the axis of rotation O.

Figure 7:
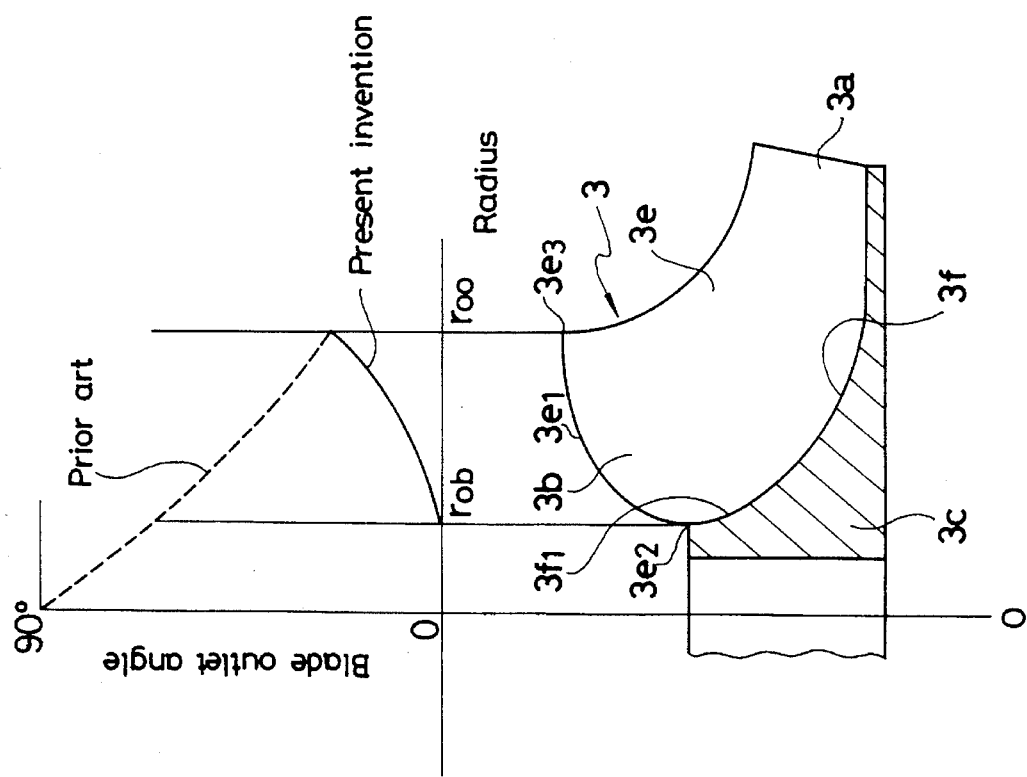
FIG. 7 is a graph to explain a form of a blade outlet of the turbine wheel of the embodiment shown in FIG. 1.

Each of the blade outlet edges $3e_1$ has a portion $3e_2$ at the side of the boss shroud $3f_1$ (hereinafter referred to as "near-boss shroud portion $3e_2$") and a near-casing portion $3e_3$ at the side of the casing 8, that is, a tip portion of the blade outlet (hereinafter referred to as "near-casing portion $3e_3$"). The near-boss shroud portion $3e_2$ of the outlet edge $3e_1$ is smoothly continuous to the boss shroud $3f_1$ and largely projects downstream. The near-casing portion $3e_3$ of the blade outlet edge $3e_1$ is formed substantially perpendicular to the axis of rotation O. Further the blade outlet edge $3e_1$ is formed with a smooth ark-like curve projecting convexly downstream between the near-casing portion $3e_3$ and the near-boss shroud portion $3e_2$. The outlet angle of the blade outlet edge $3e_1$ is set to an angle of substantially 0° at the near-boss shroud portion $3e_2$ of the blade outlet edge $3e_1$ and smoothly increasing from the near-boss shroud portion $3e_2$ to the near-casing portion $3e_3$. That is, while the blade outlet angle of the conventional turbine wheel is set to be varied in a curve as shown by the dashed line of FIG. 7 to be an angle of 90° at the axis of rotation O and to increase remarkably at the side of a boss radius, the blade outlet angle at the blade outlet edge $3b$ of this embodiment is set to an angle of substantially 0° at a boss radius rob as shown by the solid line of FIG. 7 and smoothly increasing from the boss radius rob toward a blade outlet radius $r_{oo}$. Therefore, the blade outlet angle of this embodiment is set to be varied in a curve which has an inclination contrary to that of the curve of the conventional design shown by the dashed line. In the example shown, the outlet angle of the blade outlet edge $3e_1$ is set to substantially an angle generally calculated by the conventional design techniques at the near-casing portion $3e_3$ of the blade outlet edge $3e_1$. However, it should be understood that it is not limited to this and the outlet angle of the blade outlet edge $3e_1$ may be set to an angle which is larger or smaller than the angle generally calculated by the conventional design techniques. Further, the outlet angle between the near-boss shroud portion $3e_2$ and the near-casing portion $3e_3$ is set to be varied smoothly. Each of the blades $3e$ is formed by connecting the blade inlet $3a$ to the blade outlet $3b$ as stated above with a smooth curve.

Figure 8:
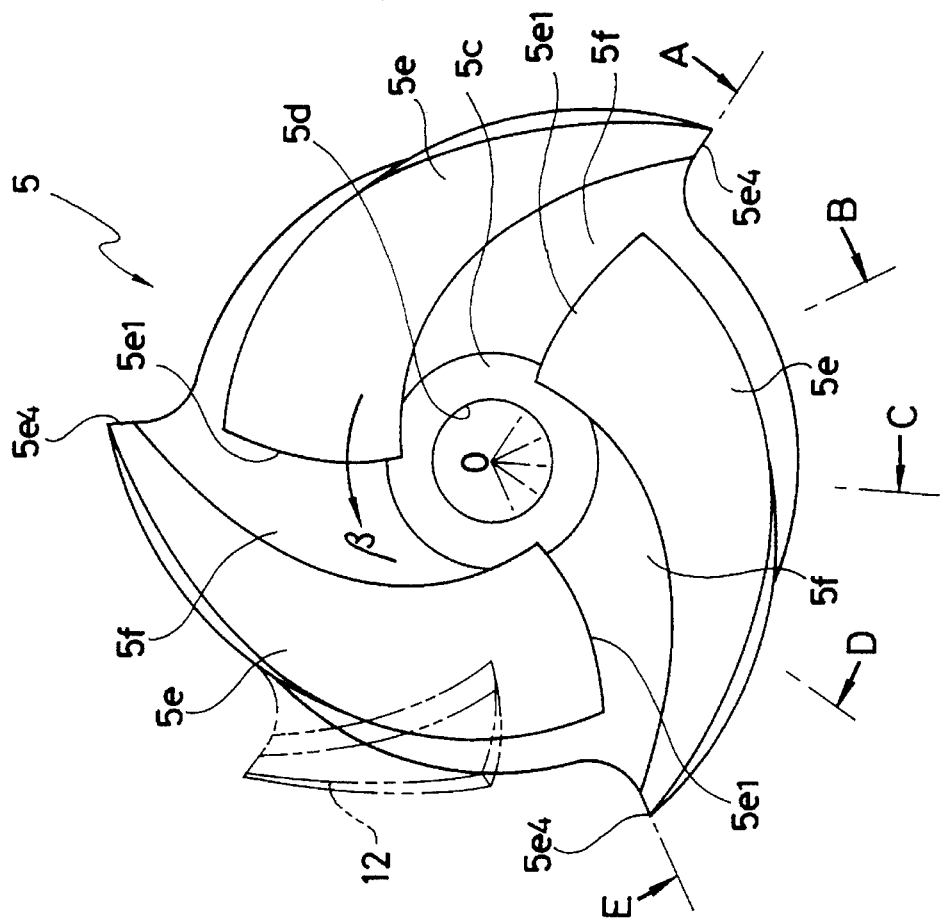
FIG. 8 is a view of a pump impeller of the embodiment shown in FIG. 1, taken in the direction of the arrow Y of FIG. 1.
Figure 9:
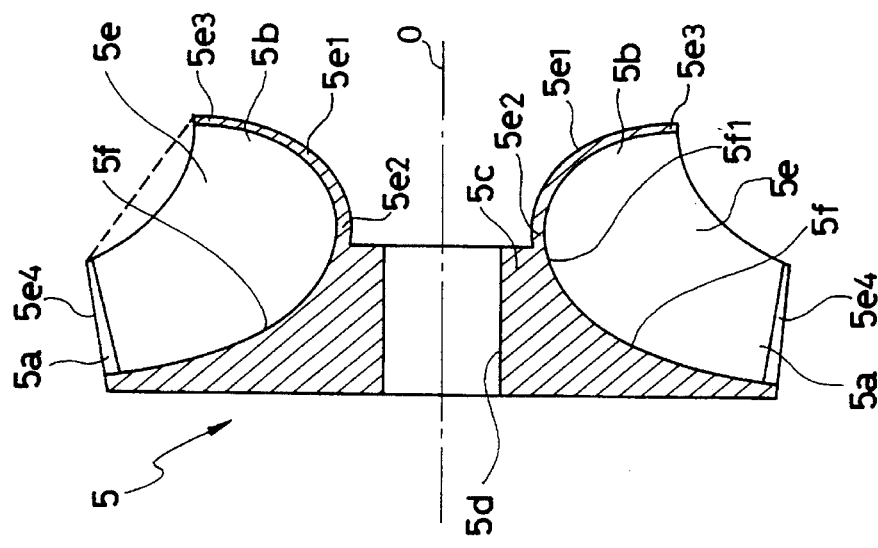
FIG. 9 is a sectional view taken along the line of A-O-E of FIG. 8.

FIG. 8 is a view of the pump impeller 5 used in this embodiment, taken in the direction of the arrow Y and FIG. 9 is a sectional view taken along the line of A-O-E of FIG. 8. The pump impeller 5 is formed completely same as the turbine wheel 3 stated above. In this case, since the flowing direction of the fluid in the pump impeller 5 is contrary to that in the turbine wheel 3, the outlet side of the pump impeller 5 is same as the inlet side of the turbine wheel 3 and the inlet side of the pump impeller 5 is same as the outlet side of the turbine wheel 3. Therefore, the numerals of components of the pump impeller 5 are shown by substituting "5" for "3" of the numerals of corresponding components of the turbine wheel 3. Thus, the numeral $5a$ designates a blade outlet, the numeral $5b$ designates a blade inlet, the numeral $5c$ designates a boss, the numeral $5d$ designates a through hole, the numeral $5e$ designates a blade, the numeral $5e_1$ designates a blade inlet edge, the numeral $5e_2$ is a portion at the side of boss shroud $5f_1$ (hereinafter referred to as "near-boss shroud portion $5e_2$") of the blade inlet edge $5e_1$, the numeral $5e_3$ designates a portion at the side of casing 10 (hereinafter referred to as "near-casing portion $5e_3$") of the blade inlet edge $5e_1$, the numeral $5e_4$ designates a blade outlet edge, the numeral $5f$ designates a shroud, and the numeral $5f_1$ designates the boss shroud.

The boss shroud $5f_1$, where the blade inlet edges $5e_1$ are fixed to, of the shroud $5f$ is substantially parallel to the axis of rotation O. The near-boss shroud portion $5e_2$ of each blade inlet edge $5e_1$ is smoothly continuous to the boss shroud $5f_1$ and largely projects upstream. The near-casing portion $5e_3$ of the blade inlet edge $5e_3$ is formed substantially perpendicular to the axis of rotation O. Further the blade inlet edge $5e_1$ is formed with a smooth ark-like curve projecting convexly upstream between the near-casing portion $5e_3$ and the near-boss shroud portion $5e_2$ The inlet angle of the blade inlet edge $5e_1$ is set to an angle of substantially 0° at the near-boss shroud portion $5e_2$ of the blade inlet edge $5e_1$ and to substantially an angle generally calculated by the conventional design techniques at the near-casing portion $5e_3$ of the blade inlet edge $5e_1$. Furthermore, the inlet angle between the near-boss shroud portion $5e_2$ and the near-casing portion. $5e_3$ is set to be varied smoothly.

Figure 4:
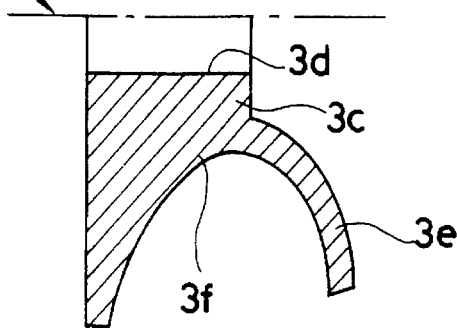
FIG. 4 is a sectional view taken along the line B-O of FIG. 2.
Figure 5:
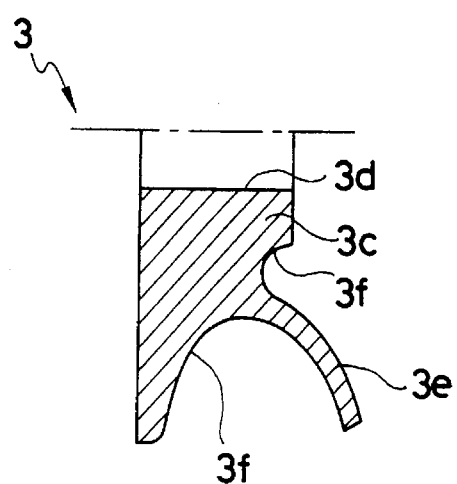
FIG. 5 is a sectional view taken along the line C-O of FIG. 2.
Figure 6:
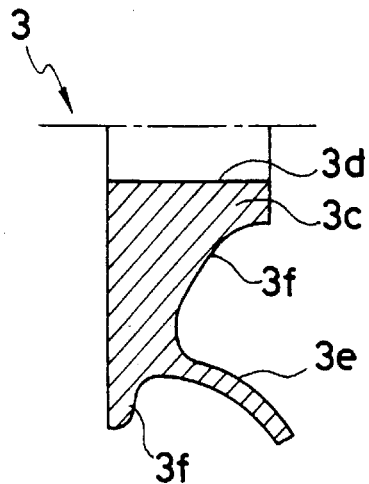
FIG. 6 is a sectional view taken along the line D-O of FIG. 2.

Since the other components of the pump impeller 5 are same as that of the turbine wheel 3, the description about the other components will be omitted. Sections of the pump impeller 5 taken along the line B-O, the line C-O, and the line D-O are same as the sections of the turbine wheel 3 as shown in FIG. 4, FIG. 5, and FIG. 6, respectively.

By the way, the blade inlet angle of the conventional pump impeller is set to be an angle of 90° at the axis of rotation O and to increase remarkably at the side of a boss. That is, the blade inlet angle of the conventional pump impeller is set to be varied in a curve as shown by the dashed line of the FIG. 10. On the contrary, according to this embodiment, the blade inlet angle of the blade inlet $5b$ is set to an angle same as the blade inlet angle calculated by the conventional design techniques at a blade inlet radius $r_{i\,o}$ as shown by the solid line of FIG. 10 and to an angle of substantially 0° at a boss radius rib, further the blade inlet angle between the blade inlet radius $r_{io}$ and the boss radius rib is set to be varied in a curve which has an inclination contrary to that of the curve of the conventional design shown by the dashed line.

In the turbo pump of this embodiment as structured above, the working fluid which is liquid such as water and oil, gas a like steam or an intermediate comprising a two-phase fluid mixture of liquid and gas is introduced into the turbine wheel 3 from the turbine inlet path 7, the working fluid then collides with the turbine blades $3e$, and the working fluid is guided by the turbine blades $3e$ and the sub turbine casing 8 to flow to the blade outlets $3b$ from the blade inlets $3a$ and flows out from the outlet $8a$ of the sub turbine casing 8. In this stage, the turbine wheel 3 is rotated in a clockwise direction a in FIG. 2 since each turbine blade $3e$ is applied with force from the working fluid.

The rotation in the direction a of the turbine wheel 3 causes the pump impeller 5 to rotate in a counter-clockwise direction b in FIG. 8 through the rotor shaft 6. By the rotation in the direction b, the carried fluid which is liquid such as water, oil, gas or an intermediate comprising a two-phase fluid mixture of liquid and gas is sucked from the inlet $10a$ of the sub pump casing 10 to flow into the blade inlets $5b$, the carried fluid is then carried to the pump blades $5e$ from the blade inlets $5b$ and guided by the pump blades $5e$ and the sub pump casing 10 to flow to the blade outlets $5a$, and the carried fluid is then discharged through the pump outlet path 9.

As the blade outlet angle of the turbine wheel 3 is set as this embodiment, the working fluid of the boss shroud can be guided smoothly out of the blade without resistance when the working fluid flows at the turbine wheel 3. Thereby, the working fluid flow uniformly at the side of the boss shroud $3e_2$ of the blade outlet $3b$ so that the working fluid is effectively operated along the whole blade of the blade outlet $3b$ (from the side of boss shroud to the side of the casing). Further, in this embodiment, the near-boss shroud portion $3e_2$ of the blade outlet edge $3e_1$ largely projects downwardly, the near-casing portion $3e_3$ is formed substantially perpendicular to the axis of rotation O, and furthermore the portion between the portions $3e_2$ and $3e_3$ is formed with a smooth ark-like curve projecting convexly downstream. The blade outlet edge $3e_1$ is thus formed, thereby providing a wider area which the fluid flows at the blade outlet $3b$. Thereby, the working fluid can efficiently flow at the blade outlet $3b$. Therefore, the cavitation characteristics of the turbine and the turbine efficiency can be improved. By improving the cavitation characteristics and the turbine efficiency, the turbine wheel 3 can be rotate at a further high speed.

On the other hand, as the blade inlet angle of the pump impeller 5 is set as this embodiment, the carried fluid around the base of the boss shroud of the blades $5e$ can be guided efficiently among the blades as scraped when the carried fluid flow in the pump impeller 5. Thereby, the carried fluid flow uniformly at the side of the boss shroud portion $5f_1$ of the blade inlets $5b$ so that the carried fluid is effectively operated along the whole blades of the blade inlets $5b$ (from the side of boss shroud to the side of the casing). Further, in this embodiment, the near-boss shroud portion $5e_2$ of the blade inlet edge $5e_1$ largely projects upwardly, the near-casing portion $5e_3$ is formed substantially perpendicular to the axis of rotation O, and furthermore the portion between the portions $5e_2$ and $5e_3$ is formed with a smooth ark-like curve projecting convexly upstream. The blade inlet edge $5e_1$ is thus formed, thereby providing a wider area which the fluid flows at the blade inlet $5b$. Thereby, the carried fluid can efficiently flow at the blade inlet $5b$. Therefore, the cavitation characteristics and the pump efficiency can be improved. By improving the cavitation characteristics and the pump efficiency, the pump impeller 5 can be rotate at a further high speed.

As mentioned above, the turbine characteristics of the turbine wheel 3, the pump characteristics of the pump impeller 5, and the cavitation characteristics of the turbine wheel 3 and the pump impeller 5 are improve so that the pump characteristics and the cavitation characteristics of the turbo pump of this embodiment are also greatly improved.

Figure 11:
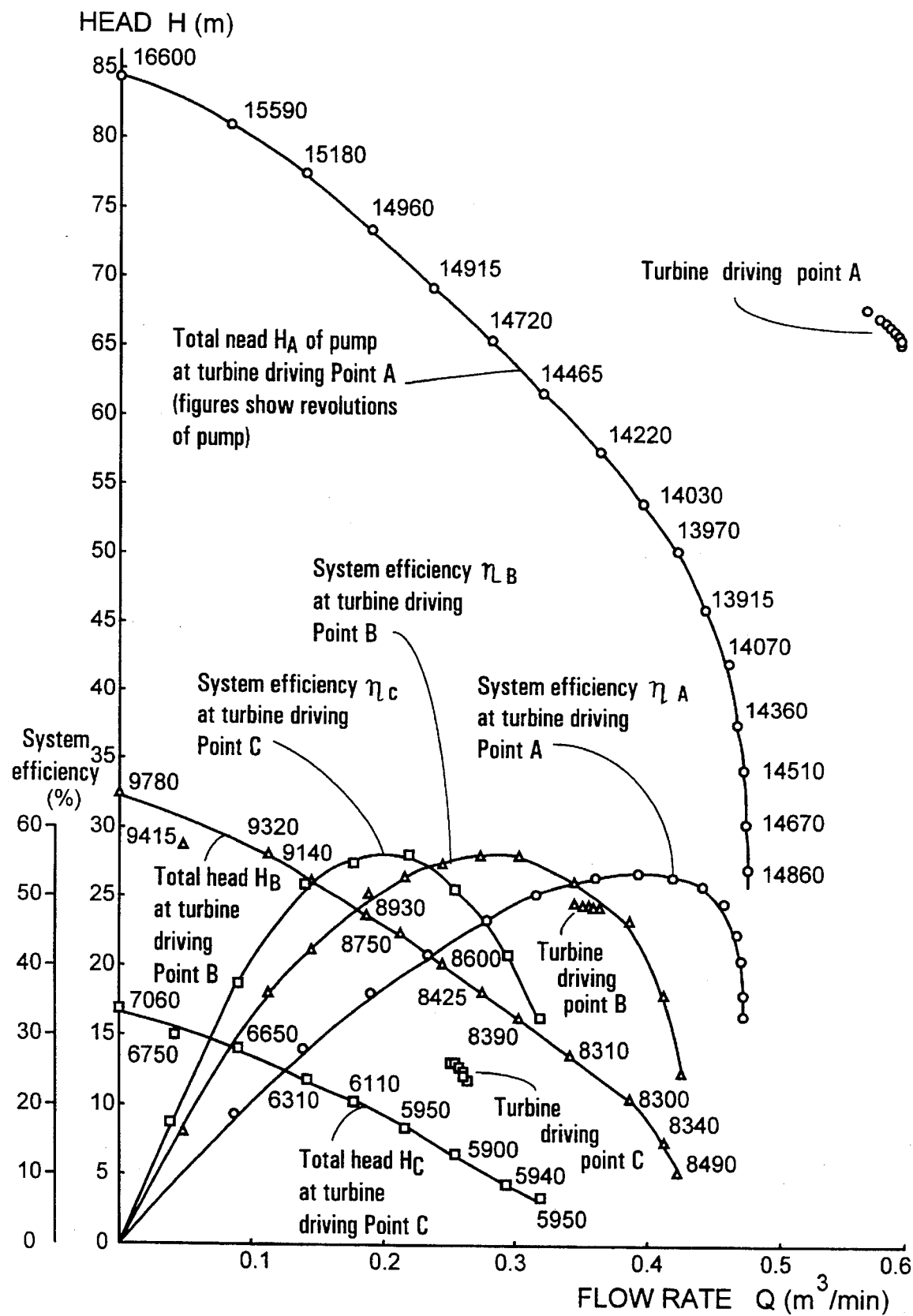
FIG. 11 is a graph showing a result of tests with regard to a pump head and efficiency of the turbo pump according to the present invention.

FIG. 11 Shows a result of tests with regard to a pump head and system efficiency (pump efficiency X turbine efficiency) of the turbo pump according to the present invention.

In FIG. 11, the mark o designates a case where the revolution of the turbo pump is 13,900~16,600 rpm, the mark A designates a case where the revolution of the turbo pump is 8,000~10,000 rpm, and the mark ▽ designates a case where the revolution of the turbo pump is 5,900~7,000 rpm. The turbine wheel 3 and the pump impeller 5 of the pump of the present invention which are used in this tests each are 52 mm in outer diameter and 7 mm in width and each have the outlet or inlet of 35 mm in diameter. The suction condition of the pump is +1 m positive head and the turbine outlet is set under the free flow condition with pressure free.

As apparent from FIG. 11, the result shows that the pump according to the present invention can be provided with a quite large pump head H(m) by high speed revolution. In addition, even if the pump rotates at a high speed as mentioned above, the peak of the system efficiency η (%) is not substantially decreased, that is, the system efficiency η is maintained at a high degree. Further, the result shows that the driving point of the turbine is little changed regardless the working point of the pump. The driving point of the turbine is little changed as mentioned above, thereby the control of the flow rate and the pressure of the working fluid to be introduced into the turbine wheel 3 becomes easy.

Therefore, the pump according to the present invention can efficiently carry a relatively large flow rate so as to ensure desired flow rate even when the pump is constructed small, thereby allowing for a high-speed operation and smaller size of the turbo pump. In this case, by improving the cavitation characteristics, the pump allows for further high-speed operation even when the working fluid or the carried fluid is liquid or an intermediate comprising a two-phase fluid mixture of liquid and gas, not to mention gas.

Furthermore, the profile at the tip side of the blades of the turbine wheel 3 and the pump impeller 5 may be that of the straight line connecting the blade inlet to the blade outlet as shown by the dashed lines in FIG. 3 and FIG. 9 or an arc-like profile formed in a concave shape along the shroud as stated in this embodiment. The turbine wheel 3 and the pump impeller 5 with such a profile at the side of the blades also provide the characteristics of flow rate-pressure equivalent to that of the turbine wheel 3 and the pump impeller 5 with the blades formed by the straight line. This naturally reduces the torque for rotating the pump impeller 5 and reduces the pressure of the turbine at the same flow rate so that the turbine efficiency and the pump efficiency may be enhanced. In addition, the curved profile of the blade tip side of the turbine wheel 3 and the pump impeller 5 allows a longer sealing line from the inlet to the outlet, which increases the volume efficiency of the turbine and the volume efficiency of the pump and therefore the turbine efficiency and the pump efficiency.

In the embodiment as mentioned above, while the turbine wheel 3 and the pump impeller 5 are each provided three blades $3e, 5e$, the present invention allows the turbine wheel 3 and the pump impeller 5 to have an arbitrary number of blades, and allows the numbers of blades of turbine wheel and the pump impeller to be different from each other.

The present invention also allows the blade inlet profile of the pump impeller 5 and the blade outlet profile of the turbine wheel 3 to be always kept uniform, regardless of the combination of the each specific speeds.

When the fluid used in the pump is gas or an intermediate such as a two-phase fluid mixture of liquid and gas, a suitable number of partial blades 11 are disposed in each space between blades $3e$ of the turbine wheel 3 or a suitable number of partial blades 11 are each disposed in each space between blades $5e$ of the pump impeller 5. This enhances the turbine efficiency or the pump efficiency. In this case, when the fluid used is gas, it is desirable to increase the number of partial blade 11, 12 among the blades $3e, 5e$.

Further, when the main turbine casing 2 and the main pump casing 4 are formed separately, the sub turbine casing 8 and the sub pump casing 10 may be omitted.

Figure 12:
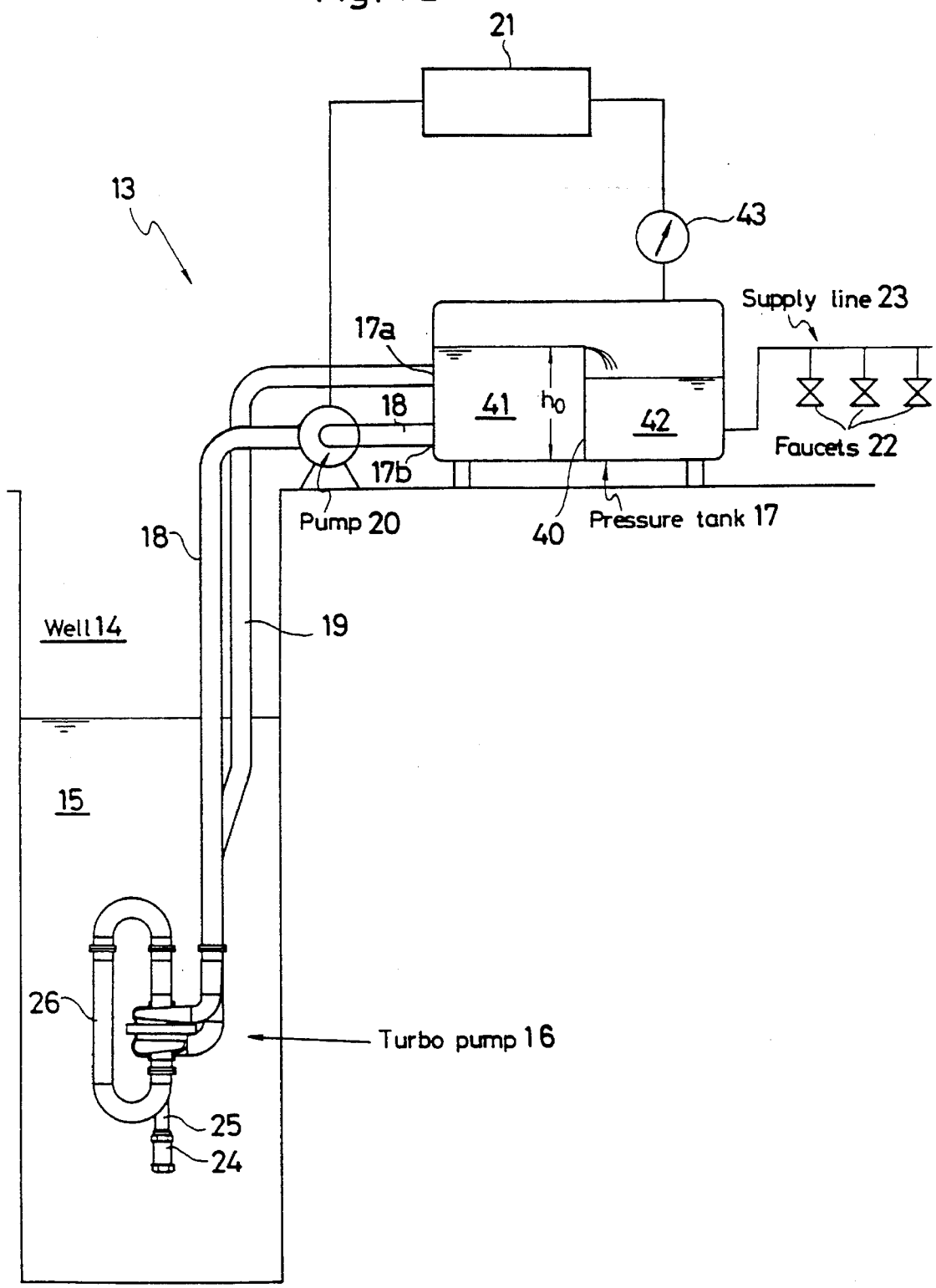
FIG. 12 is a view showing one embodiment of a fluid supply system using the turbo pump according to the present invention.
Figure 13:
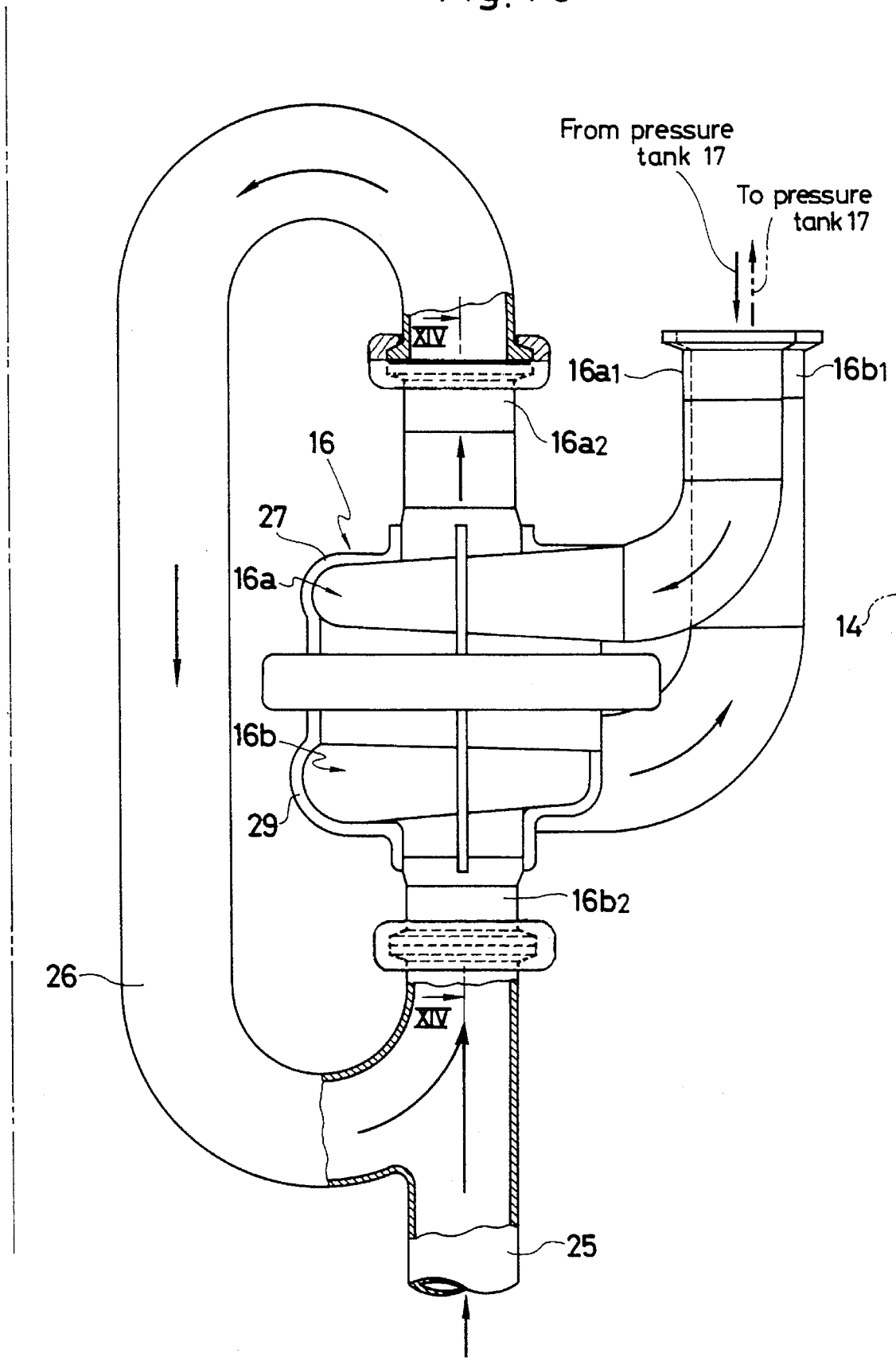
FIG. 13 is a enlarged view of portion in the water of the turbo pump shown in FIG. 12.

FIG. 12 is a view showing one embodiment of a fluid supply system using the turbo pump according to the present invention and FIG. 13 is a enlarged view of a portion in the water of the turbo pump shown in FIG. 12.

As shown in FIG. 12 and FIG. 13, a fluid supply system 13 of this embodiment basically comprises a turbo pump 16 disposed in water 15 within a well 14 constituting the turbo pump of the present invention, a pressure tank 17 mounted on the ground and constituting the tank of the present invention, a working fluid supply pipeline 18 connecting the pressure tank 17 and an input portion $16a_1$ at a driving side $16a$ of the turbo pump 16 to each other, carried fluid discharge pipeline 19 connecting a discharge portion $16b_1$ at a pump side $16b$ of the turbo pump 16 and the pressure tank 17 to each other, a pump 20 disposed to the working fluid supply pipeline 18 to supply water in the pressure tank 17 as a working fluid of the turbo pump 16 to the driving side of the turbo pump 16 and constituting the working fluid supply pump of the present invention, a control device 21 for controlling the operation of the pump 20, a supply line 23 provided with a plurality of faucets 22,22, . . . and connected to the pressure tank 17 to supply water in the pressure tank 17 to the faucets 22,22, . . . respectively.

A carried fluid suction pipeline 25 having an opening in the water 15 of the well 14 through a check valve 24 is connected to a suction portion $16b_2$ at a pump side $16b$ of the turbo pump 16. The check valve 24 is arranged to allow only the flow of water from the well 14 toward the suction portion $16b_2$ of the turbo pump 16. As shown in FIG. 13, an exhaust portion $16a_2$ at the driving side $16a$ of the turbo pump 16 is connected to the carried fluid suction pipeline 25 in just front of the suction portion $16b_2$ through the working fluid exhaust pipeline 26.

Figure 14:
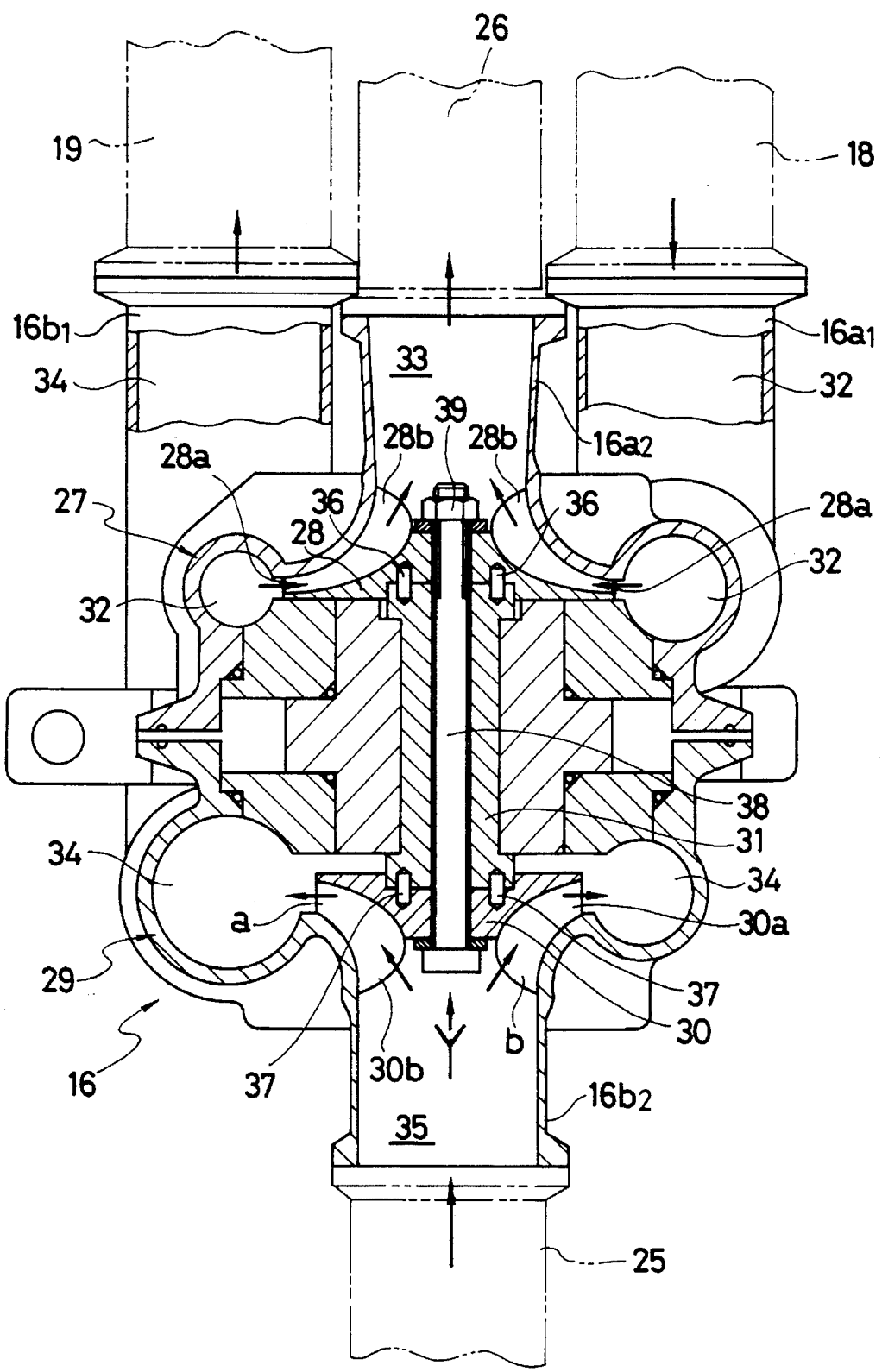
FIG. 14 is a sectional view taken along the line XIV—XIV of FIG. 13.
Figure 15:
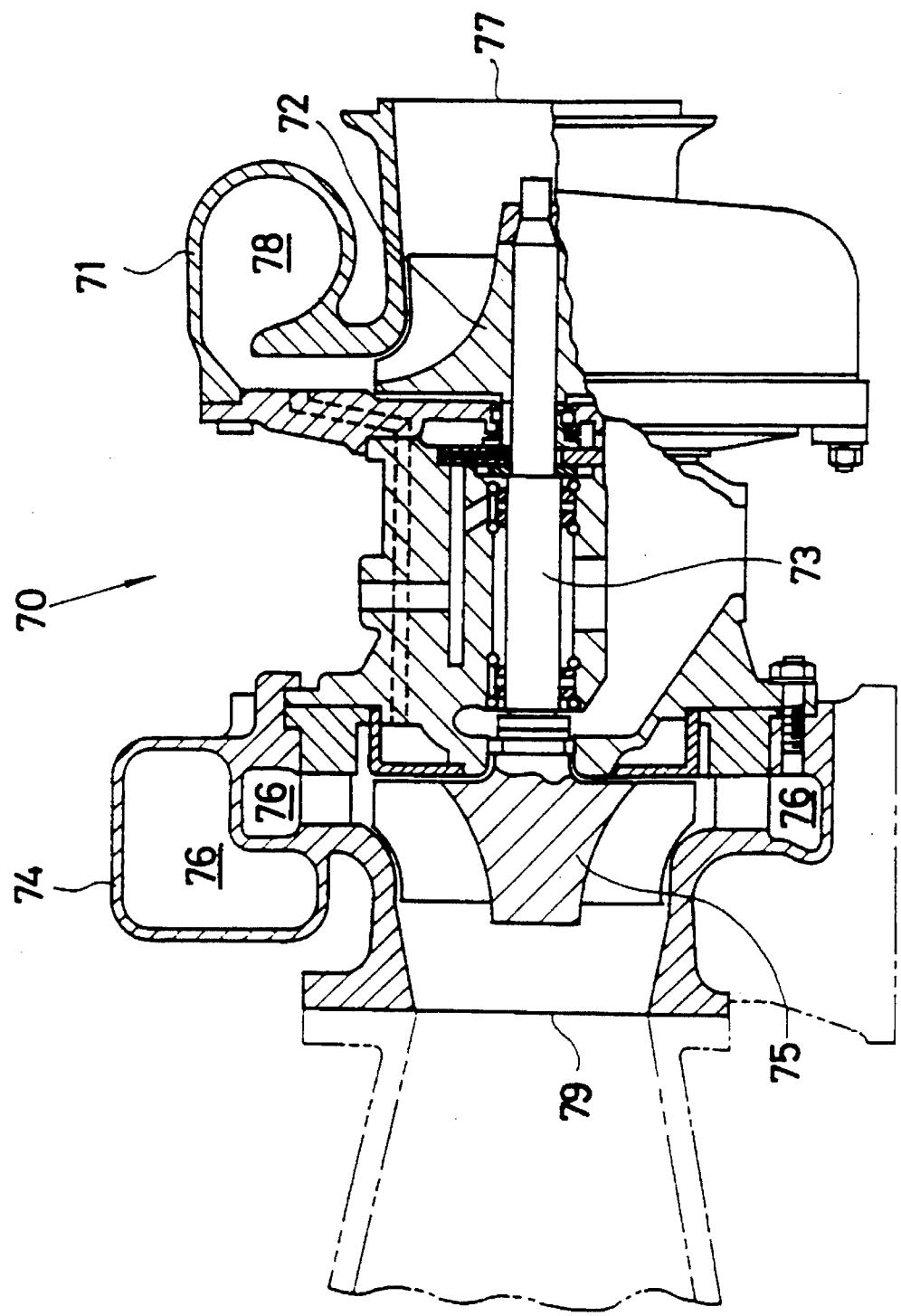
FIG. 15 is a sectional view showing an example of a conventional turbo charger.

FIG. 14 is a sectional view taken along the line XIV—XIV of FIG. 13.

As shown in FIG. 14, the turbo pump 16 is a turbo pump and comprises a turbine wheel 28 rotatably disposed in the turbine casing 27, a pump impeller 30 rotatably disposed in the pump casing 29, and rotor shaft 31 rotatably supported to a boundary portion between the turbine casing 27 and the pump casing 28, wherein the turbine wheel 28 is fixed to one end of the rotor shaft 31 and the pump impeller 30 is fixed to the other end of the rotor shaft 31.

A turbine inlet path 32 through which water, i.e., the working fluid for rotating the turbine wheel 28, flows by connecting the working fluid supply pipeline 18 is disposed at an inlet portion of the turbine casing 27, which is the input portion $16a_1$ of the driving side $16a$ of the turbo pump 16. The turbine inlet path 32 is formed in a scroll-like shape to connect to a blade inlet $28a$ of the turbine wheel 28.

A turbine outlet path 33 through which the water, i.e., the working fluid exhausted its energy for rotating the turbine wheel 28, flows is disposed at an outlet portion of the turbine casing 27, which is the exhaust portion $16a_2$ at the driving side $16a$ of the turbo pump 16. The turbine outlet path 33 is disposed to connect to a blade outlet $28b$ of the turbine wheel 28 and to connect to a pump inlet path 23 (described later) through the working fluid exhaust pipeline 26.

On the other hand, a pump outlet path 34 through which water, i.e., the carried fluid carried by the pump impeller 30, flows by connecting the carried fluid supply pipeline 19 is disposed at a discharge portion of the pump casing 29, which is the discharge portion $16b_1$ of the pump side $16b$ of the turbo pump 16. The pump outlet path 34 is formed in a scroll-like shape to connect to a blade outlet $30a$ of the pump impeller 30.

A pump inlet path 35 through which the water, i.e., the carried fluid to be sucked by the pump impeller 30, flows by connecting to the carried fluid suction pipeline 25 is disposed at an inlet portion of the turbine casing 29, which is the suction portion $16b_2$ at the pump side $16b$ of the turbo pump 16. The pump inlet path 35 is disposed to connect to a blade inlet $30b$ of the pump impeller 30.

The turbine wheel 28 and the rotor shaft 31 are connected with each other not to permit the relative rotation between them by a key 36. The pump impeller 30 and the rotor shaft 31 are connected with each other not to permit the relative rotation between them by a key 37. Further, the turbine wheel 28, pump impeller 30 and a rotor shaft 31 are fixed to be axially connected each other by a connecting bolt 38 and a nut 39.

In the turbo pump 16, the diameter of the turbine wheel 28 and inner diameters of the working fluid supply pipeline 18, the working fluid exhaust pipeline 26, the turbine inlet path 32, and the turbine outlet path 33 are designed to provide the-turbine with a turbine characteristics of small flow rate and high effective head. Further, the diameter of the pump impeller 30 and inner diameters of the carried fluid discharge pipeline 19, the carried fluid suction pipeline 25, the pump inlet path 35, and the pump outlet path 34 are designed to provide the pump with a pump characteristics of large flow rate and low pump head. That is, the turbine characteristics and the pump characteristics are set to be different from each other.

FIG. 12, FIG. 13, and FIG. 14 are conceptual views for providing a basic concept of the present invention. Therefore, the present invention is not limited to that illustrated. For example, though the turbine casing 27, pump casing 29, and the working fluid exhaust pipeline 26 are formed separately, these may be integrally formed to be provided with the working fluid exhaust pipeline 26 or other working fluid exhaust pipeline, having the same function, inside thereof.

Figure 10:
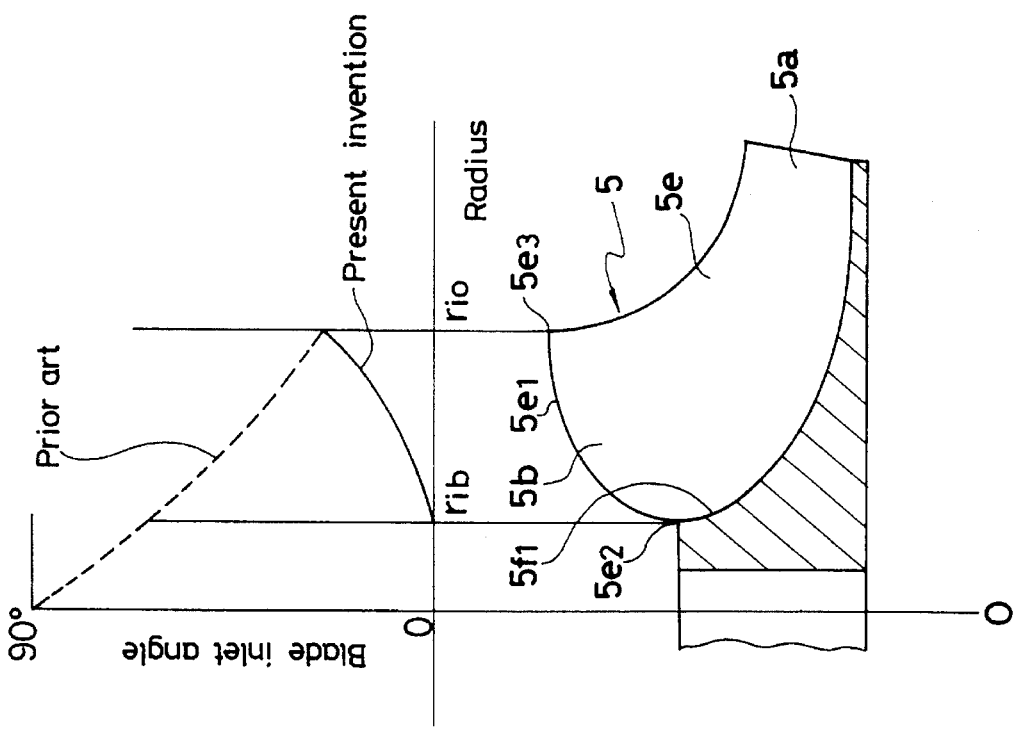
FIG. 10 is a graph to explain a form of a blade inlet of the pump impeller of the embodiment shown in FIG. 1.

The blade profile of the turbine wheel 28 is designed to be the same as the above mentioned blade profile of the turbine wheel 3 as shown in FIG. 2, FIG. 3, FIG. 4, FIG. 5, FIG. 6, and FIG. 7. The blade profile of the pump impeller 30 is designed to be the same as the above mentioned blade profile of the pump impeller 5 as shown in FIG. 8, FIG. 9, and FIG. 10. Therefore, the description about the blade profiles is omitted. As mentioned above, in the turbine wheel 28 of the turbo pump 16, a cavitation is difficult to occur, thereby improving the cavitation characteristics of the turbine, reducing the loss of the energy of water, and therefore improving the turbine efficiency. The improvements of the cavitation characteristics and the turbine efficiency allow the turbine wheel 28 to rotate at a further high speed. While, the cavitation characteristics and the pump characteristics in the pump impeller 30 of the turbo pump 16 can also be improved. Because of the improvement of the cavitation characteristics and the pump characteristics in this manner, the pump impeller 30 can be rotated at a further high speed. Since the turbine characteristics of the turbine wheel 28, the pump characteristics of the pump impeller 30, and the cavitation characteristics of them are improved, the pump characteristics and the cavitation characteristics of the turbo pump 16 of this embodiment are significantly improved.

The inside, of the pressure tank 17 is divided into a first chamber 41 and a second chamber 42 by a partition wall 40 having a predetermined height. The carried fluid discharge pipeline 19 is connected to a first connecting hole $17a$ at the upper portion of the first chamber 41. The working fluid supply pipeline 18 is extended from a second connecting hole $17b$ at the lower portion of the first chamber 41. The supply line 23 is also connected to the lower portion of the second chamber 42. Therefore, the water discharged from the turbo pump 16 flows into the first chamber 41 through the carried fluid discharge pipeline 19 and is stored in the first chamber 41. The water stored in the first chamber 41 is carried to the turbine inlet path 32 of the turbo pump 16 through the working fluid supply pipeline 18 by the pump 20. In this stage, as the water level of the water stored in the first chamber 41 is over a fixed water level ho defined by the partition wall, the water in the first chamber 41 flows over the partition wall 40 into the second chamber 42 and is stored in the second chamber 42. The water stored in the second chamber 42 is carried to the supply line 23 and is separately supplied from each faucet 22. In this case, the inner pressure of the pressure tank 17 is kept at a predetermined level and the water is carried to the supply line 23 by the inner pressure of the pressure tank 17.

For keeping the inner pressure of the pressure tank 17 at the predetermined level, the pressure tank 17 is provided with pressure detecting means 43 such as a pressure switch, a pressure sensor or a pressure gauge. The pressure detecting means 43 output a pressure failure signal to the control device 21 when the inner pressure of the pressure tank 17 falls by a predetermined amount lower than the predetermined level.

The control device 21 controls the pump 20 to keep the inner pressure of the pressure tank 17 at the predetermined level according to the pressure failure signal from the pressure detecting means 43.

In the fluid supply system 13 of this embodiment as structured above, when the water level of the water in the second chamber 42 of the pressure tank 17 is low and the inner pressure of the pressure tank 17 is lower than the predetermined level by the predetermined amount, the control means 21 operate the pump 20 according to the pressure failure detecting signal outputted from the pressure detecting means 43. By the operation of the pump 20, the water in the pressure tank 17 is supplied as a working fluid to the turbine inlet path 32 through the working fluid supply pipeline 18.

Further, as the water is introduced to the turbine wheel 28 from the turbine inlet path 32, the water collides turbine blades 28e from blade inlets 28a and is guided from the turbine blades 28e and the turbine casing 27 to the blade outlets 28b. The water then flows out of the turbine outlet path 33. In this stage, the turbine blades 28e are applied with force from the water so that the turbine wheel 28 rotates in the clockwise direction α in FIG. 4.

The rotation of the turbine wheel 28 in the clockwise direction α causes the pump impeller 30 to rotate in a counter-clockwise direction β in FIG. 10 through the rotor shaft 31. By the rotation of the pump impeller 30 in the counter-clockwise direction β, the water in the well 14 is sucked from the inlet path 35 of the pump casing 29 through the check valve 24 and the pump suction pipeline 25 to flow into the blade inlets 30b and is carried from the blade inlets 30b to the pump blades 30e and the pump casing 29 to flow to the blade outlets 30a. The water is then exhausted out of the pump outlet path 34.

Since the respective characteristics of the turbine wheel 28 and the pump impeller 30 are changed, the water flowing out of the turbine outlet path 33 after rotating the turbine wheel 28 flows into the pump suction pipeline 25 through the working fluid discharge pipeline 26 and is sucked into the pump inlet path 35 by the pump impeller 30 with the water 15 sucked from the well 14 through the pump suction pipeline 25. Therefore, the flow rate of the water discharged through the pump outlet path 34 is considerably larger than the flow rate of the water supplied from the pressure tank 17 to the turbine wheel 28.

The water discharged from the turbo pump 16 through the carried fluid discharge pipeline 19 flows into the first chamber 41 of the pressure tank 17 and is stored in the first chamber 41. Since the flow rate of the water flowing into the first chamber through the carried fluid discharge pipeline 19 is larger than the flow rate of the water flowing out of the first chamber 41 through the working fluid supply pipeline 18, the water level in the first chamber increases. As the water level in the first chamber is over the fixed water level $h_0$, the water in the first chamber 41 overflows the partition wall 40 to the second chamber 42 to be stored therein. The water level in the second chamber 42 is therefore increased. The increase of the water level in the second chamber 42 causes the inner pressure of the pressure tank 17 higher. As the inner pressure of the pressure tank 17 reaches the predetermined level of pressure, the pressure detecting means 43 detect this and stop outputting the pressure failure detecting signal which has been outputted to the control device 21. Thereby, the control device 21 stops the operation of the pump 20 so that the turbo pump 16 stops, thereby stopping the flow of water into the pressure tank 17.

As the water in the second chamber 42 of the pressure tank 17 is used through the faucets 22 of the supply line 23, the water level in the second chamber 42 becomes lower. The decrease of the water level in the second chamber 42 causes the inner pressure of the pressure tank 17 to fall. As the inner pressure of the pressure tank 17 falls by the predetermined amount from the predetermined level, the pressure detecting means 43 output the pressure failure detecting signal to the control device 21. Thereby, as mentioned above, the control device 21 operates the pump 20 and further the turbo pump 16 so as to supply water to the pressure tank 17. As the inner pressure of the pressure tank 17 rises to the predetermined level, the control device 21 stops the operation of the pump 20 as mentioned above.

In this manner, the control device 21 controls the pump 20, i.e., the turbo pump 16, according to the pressure failure signal from the pressure detecting means 43 so that the inner pressure of the pressure 17 is kept at the predetermined level.

By the way, in this embodiment, the water in the pressure tank 17 is divided into the water for supplying for the turbo pump 16 and the water for supplying for the supply line 23 by the partition wall 40. Thereby, even when there is no water in the second chamber anyway, the water in the first chamber 41 is saved, thereby easily and securely operating the turbo pump. For saving the water in the first chamber 41, it is necessary to secure the shaft seal of the pump 20 to prevent leakage of fluid from the shaft seal.

In this embodiment, the turbo pump 16 is driven by the water 15 in the well 14 which is then lifted so that the turbo pump 16 is further driven the water lifted. Therefore, it is not necessary not only to use special fluid as the working fluid for rotating the turbine wheel 28 of the turbo pump 16 and but also to prevent mixing of the working fluid for the turbine wheel 28 and the carried fluid for the pump impeller 30 so that the turbo pump 16 is not needed with a seal such as the shaft seal or the like. It makes the waterproof structure of the turbo pump 16 simple, so that the cost of production can be reduced. In this case, the turbo pump 16 has no electric motor and no cable for supplying electric power to the electric motor so that it is not necessary to consider of sealing the electric motor and the cable. Therefore, as compared with the staged pump 52 and the electric motor 53 of the conventional fluid supply system as mentioned above and as shown in FIG. 16, the waterproof structure in the turbo pump 16 is further simpler and the turbo pump 16 is smaller so that the cost of production can be reduced more.

Since the turbo pump 16 can be smaller and can have the simple waterproof structure, the maintenance can be quite easy and the turbo pump 16 can be easily installed without any trouble with installing it into the water in the long and narrow deep well 14.

In addition, since the turbo pump 16 of this embodiment 16 has no electric motor, it can be applied for fluid, such as hot spring, hydrogen sulfide or the like, which is high-temperature, is easy to steam up, and needs special dealings such as corrosion resistance. That is, the fluid supply system according to the present invention is not limited to apply to a well as mentioned above and can be applied as any kind of fluid supply system.

Instead of the pressure detecting means 43 of the above mentioned embodiment, a level gage such as level sensor or the like for detecting the water level in the second chamber 42 of the pressure tank 17 may be provided so that the pump 20 is controlled to keep the water level in the second chamber 42 at the fixed water level according to the water level failure detecting signal from the level gage.

Figure 16:
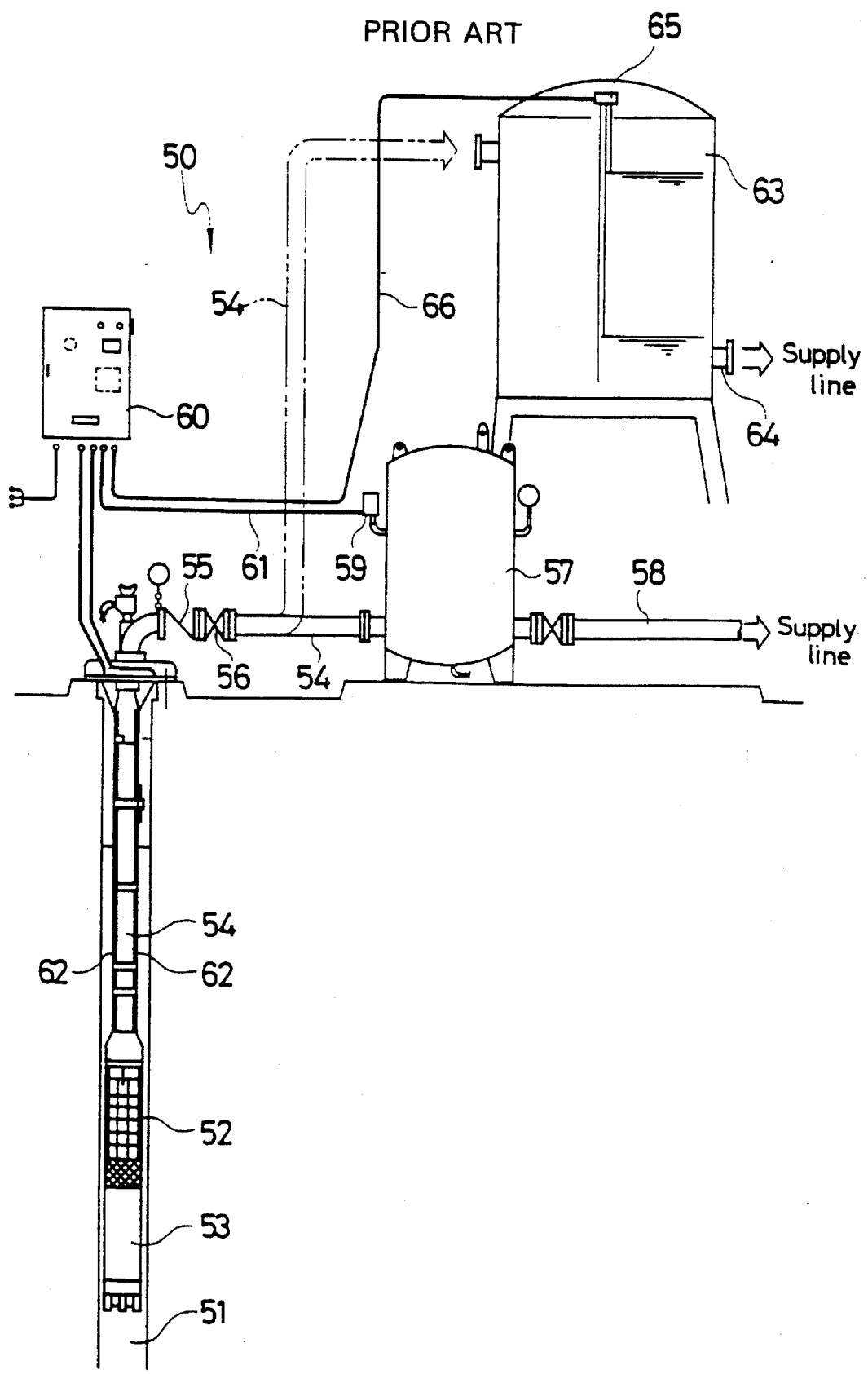
FIG. 16 is a view showing an example of a fluid supply system using a conventional submersible motor pump.

Further, instead of the pressure tank 17 of the above mentioned embodiment, the fluid supply system may have a head tank as the conventional fluid supply system as shown in FIG. 16. In this case, the head tank is also divided into two chambers by a partition wall in the same way of the pressure tank 17 of the above mentioned embodiment.

In addition, according to the present invention, instead of the working fluid exhaust pipeline 26 of the above mentioned embodiment, the water after rotating the turbine wheel 28 can be exhausted in the well 14 directly.

Furthermore, though the turbine wheel 28 and the pump impeller 30 are each provided with three blades 28e or 30e in the above mentioned embodiment, the present invention allows the turbine wheel and the pump impeller to each have any other number of blades, and allows the numbers of blades of turbine wheel and the pump impeller to be different from each other.

As apparent from the above description, according to the turbo pump, the turbine characteristics of the turbine wheel, the pump characteristics of the pump impeller, and the cavitation characteristics of the turbine wheel and the pump impeller can be improved, thereby greatly improving the pump characteristics and the cavitation characteristics of the turbo pump of the present invention.

In addition, the pump according to the present invention can effectively carry at a relatively large flow rate so as to ensure desired flow rate even when the pump is constructed small, thereby allowing for a high-speed operation and smaller size of the turbo pump. In this case, by improving the cavitation characteristics, the pump allows for further high-speed operation even when the working fluid or the carried fluid is liquid or an intermediate comprising a two-phase fluid mixture of liquid and gas, not to mention gas.

Further, the present invention allows for a high-speed operation and smaller size of the turbo pump only by forming the blades in the shape as disclosed in the present invention and therefore allows a quite simple structure.

Furthermore, according to the structure of the present invention, the revolution (rotation) of the pump is naturally increased as the density of the carried fluid at the pump side is smaller, so that the it is not necessary to change the working fluid energy for the turbine and an intermediate media can also be carried. Therefore, it is easy to control the pump and easy to assemble the system.

Furthermore, if part of the fluid discharged from the turbo pump is pressurized by the working fluid supply pump and the pressurized fluid also drives the turbo pump itself, the fluid supply system of the present invention can be applied to not only well but also any fluid storing place. The turbo pump having the same structure as the turbo pump shown in FIG. 14 should not be limited to the applications mentioned above and can be used for carrying fluid in various kinds of fields such as foods, medicines, chemicals and the like.

What we claim is:

1. A turbo pump comprising a pump impeller rotatably disposed in the pump casing for rotation, to carry carried fluid which is any one of liquid, gas, and an intermediate comprising a two-phase fluid mixture of liquid and gas, a turbine wheel rotatably disposed in a turbine casing coaxially with said pump impeller and being rotated by working fluid which is any one of liquid, gas, and an intermediate comprising a two-phase fluid mixture of liquid and gas, said pump impeller being rotated by the rotating the turbine wheel, wherein said pump impeller comprises a shroud continuously formed with a boss into which a rotor shaft fits and blades each having a blade inlet, said shroud having a concave arcing rotatable surface formed in a meridian plane configuration and a boss shroud formed in a cylindrical configuration substantially parallel to said rotor shaft, an edge of said blade inlet being fixed to said boss shroud to be smoothly continuous from a surface of said boss shroud to the upstream side and largely projecting upstream, said edge of said blade inlet having a portion attached to said cylindrical boss shroud and a portion near said pump casing, said portion near said pump casing extending substantially perpendicular to said rotor shaft, said portion attached to said boss shroud and said portion near said pump casing being connected therebetween by a smooth arc-like curve projecting convexly upstream to thereby form the edge of said blade inlet, and angle of said blade inlet being set to an angle of substantially 0° to the direction of its tangent at said portion of said edge near said boss shroud and increasing continuously from said portion of said edge near said boss shroud to said portion of said edge near the casing, said angle of the blade inlet being varied smoothly between said portion near said boss shroud and said portion near said casing to thereby form said blade inlet, and said blade inlet being connected to the end of the blade outlet with a smooth curved surface to thereby form each of said blades; and said turbine wheel comprises a shroud continuously formed with a boss into which said rotor shaft fits and blades each having a blade outlet, said shroud having a concave arcing rotatable surface formed in a meridian plane configuration and a boss shroud formed in a cylindrical configuration substantially parallel to said rotor shaft, an edge of said blade outlet being fixed to said boss shroud to be smoothly continuous from a surface of said boss shroud to the downstream side and largely projecting downstream, said edge of said blade outlet having a portion attached to said cylindrical boss shroud and a portion near said turbine casing, said portion near said turbine casing extending substantially perpendicular to said rotor shaft, said portion attached to said boss shroud and said portion near said turbine casing being connected therebetween by a smooth arc-like curve projecting convexly downstream to thereby form the edge of said blade outlet, an angle of said blade outlet being set to an angle of substantially 0° to the direction of its tangent at said portion of said edge near said boss shroud and increasing continuously from said portion of said edge near said boss shroud to said portion of said edge near the casing, said angle of the blade outlet being varied between said portion near said boss shroud and said portion near said casing to thereby form said blade outlet, and said blade outlet being connected to the end of the blade inlet with a smooth curved surface to thereby form each of said blades.

2. A fluid supply system using a turbo pump as claimed in claim 1 comprising;

the turbo pump installed in fluid in a fluid-storing place such as a well to suck and discharge the fluid;

a working fluid supply pump for providing working fluid for driving said turbo pump;

a tank for storing fluid discharged from said turbo pump;

a supply line for receiving the fluid from said tank and supplying the fluid to a supply portion;

working fluid supply pump control means for controlling said working fluid supply pump;

said turbine wheel connecting to said pump impeller through a rotor shaft for driving said pump impeller; and said working fluid supply pump supplying a part of the fluid in said tank as a working fluid for driving said turbine wheel;

whereby a part of the fluid discharged by said turbo pump impeller is pressurized by said working fluid supply pump and the thus pressurized fluid is fed as a working fluid back to the driving side of said pump to also drive said turbo pump itself.

3. A fluid supply system as claimed in claim 2, wherein said fluid is liquid, said tank has a partition wall which divides the inside thereof into a first chamber connecting to said turbo pump and connected to said working fluid supply pump and a second chamber connected to said supply line, said partition wall being liquid level control means designed to store the liquid having a first predetermined liquid level in said first chamber and to control the liquid level in said first chamber to introduce the liquid overflowing to said second chamber when the liquid in said first chamber is over said first predetermined liquid level in said first chamber.

4. A fluid supply system as claimed in claim 3, wherein said pump control means control the operation of said working fluid supply pump according to at least one of the liquid level in said second chamber and the inner pressure of said tank to keep the liquid in said second chamber at a second predetermined liquid level or to keep the inner pressure of said tank at a predetermined level.

5. A fluid supply system using a turbo pump as claimed in any one of claims 2, 3, and 4, further comprising;

a carried fluid suction pipe line with a check valve connected to an inlet of said turbo pump, through which the fluid sucked by said turbo pump from said fluid-storing place passes;

said check valve for allowing the flowing of said fluid toward the inlet of said turbo pump and for preventing the flowing of said fluid in the opposite direction; and a path for introducing said working fluid after driving said turbine wheel to said carried fluid suction pipe line between an inlet of said turbo pump and said check valve;

said working fluid after operating said turbine wheel is sucked together with the fluid in said fluid-storing place by said turbo pump.

6. A fluid supply system as claimed in claim 3 or 4, wherein said tank is a head tank which is installed at a position higher than the supply line to control the liquid level in said second chamber to keep it at said second predetermined liquid level.

7. A turbo pump as claimed in claim 1 wherein said pump impeller and said turbine impeller are arranged in only one stage in the axial direction.

* * * * *